US012200438B2

(12) United States Patent
Hollinshead et al.

(10) Patent No.: US 12,200,438 B2
(45) Date of Patent: Jan. 14, 2025

(54) SPECTRAL COMPENSATION FILTERS FOR CLOSE PROXIMITY SOUND SOURCES

(71) Applicant: MERIDIAN AUDIO LIMITED, Cambridgeshire (GB)

(72) Inventors: Richard J. Hollinshead, Windeck (DE); Christopher A. Gribben, Bedfordshire (GB); Laurence J. Hobden, Bedfordshire (GB)

(73) Assignee: MERIDIAN AUDIO LIMITED, Cambridgeshire (GB)

( * ) Notice: Subject to any disclaimer, the term of this patent is extended or adjusted under 35 U.S.C. 154(b) by 318 days.

(21) Appl. No.: 17/775,756

(22) PCT Filed: Nov. 13, 2020

(86) PCT No.: PCT/EP2020/082077
§ 371 (c)(1),
(2) Date: May 10, 2022

(87) PCT Pub. No.: WO2021/094549
PCT Pub. Date: May 20, 2021

(65) Prior Publication Data

US 2022/0394379 A1 Dec. 8, 2022

(30) Foreign Application Priority Data

Nov. 15, 2019 (GB) ..................................... 1916690

(51) Int. Cl.
*H04R 1/40* (2006.01)
*H04R 3/12* (2006.01)
(Continued)

(52) U.S. Cl.
CPC ............... *H04R 1/403* (2013.01); *H04R 3/12* (2013.01); *H04R 5/04* (2013.01); *H04R 29/002* (2013.01);
(Continued)

(58) Field of Classification Search
None
See application file for complete search history.

(56) References Cited

U.S. PATENT DOCUMENTS 4,525,857 A * 6/1985 Orban .................... H03G 11/00 381/100
5,189,703 A 2/1993 Holman
(Continued)

FOREIGN PATENT DOCUMENTS

| | | | |
|---|---|---|---|
| EP | 2047456 | A2 | 4/2009 |
| WO | 2008019231 | A2 | 2/2008 |
| WO | 2016203216 | A1 | 12/2016 |

OTHER PUBLICATIONS

Great Britain Search Report dated Apr. 24, 2020 which was issued in connection with GB1916690.9.
(Continued)

*Primary Examiner* — Duc Nguyen
*Assistant Examiner* — Assad Mohammed
(74) *Attorney, Agent, or Firm* — Buckley, Maschoff & Talwalkar LLC

(57) ABSTRACT

A method of generating a signal for driving a first linear array of sound sources. The first linear array of sound sources comprises a primary sound source and one or more secondary sound sources. The method comprises the steps of receiving an audio signal for a first channel of an audio system, deriving, from the audio signal, a first signal and a second signal, applying a low-pass filter to the second signal to generate a second drive signal for driving the one or more secondary sound sources, and applying a corresponding high-frequency shelving filter to the first signal to generate a first drive signal for driving the primary sound source. A computer program product and an audio system for generating a levelled sound field is also provided.

20 Claims, 7 Drawing Sheets

(51) Int. Cl.
*H04R 5/04* (2006.01)
*H04R 29/00* (2006.01)
*H04S 7/00* (2006.01)

(52) U.S. Cl.
CPC ............ *H04S 7/30* (2013.01); *H04R 2201/40* (2013.01); *H04S 2420/07* (2013.01)

(56) References Cited

U.S. PATENT DOCUMENTS 7,778,427 B2 * 8/2010 Klayman ............... H03G 5/165 381/1
2006/0147056 A1 7/2006 Klayman
2007/0086606 A1 4/2007 Goodwin
2008/0118072 A1 * 5/2008 Tsutsui ...................... H04S 5/00 381/17
2015/0373454 A1 * 12/2015 Shidoji .................. H04R 1/403 381/98
2016/0073215 A1 * 3/2016 De Bruijn ............. G10L 19/008 381/17
2017/0070839 A1 3/2017 Mihelich et al.
2017/0127209 A1 5/2017 Bostick et al.
2019/0005969 A1 * 1/2019 Dick ..................... G10L 19/035
2019/0090060 A1 * 3/2019 Fazi ......................... H04R 5/04
2019/0253801 A1 * 8/2019 Arteaga ................. H04R 5/027

OTHER PUBLICATIONS

International Search Report and Written Opinion dated Feb. 12, 2021 which was issued in connection with PCT/EP2020/082077.
European Examination Report dated May 8, 2024 which was issued in connection with EP 20 807 720.6.
Mike Levine: "Practical EQ Techniques", Sep. 4, 2019 (Sep. 4, 2019), pp. 1-11, XP93157799, Retrieved from the Internet: URL:https ://hub. yamaha. com/proaudio/recording/recording-basics-practical-eq-techniques/.
Chinese Office Action dated Jun. 27, 2024 which was issued in connection with Chinese Application No. 202080076527.6.

* cited by examiner

SPECTRAL COMPENSATION FILTERS FOR CLOSE PROXIMITY SOUND SOURCES

CROSS REFERENCE TO RELATED APPLICATIONS

This application claims the benefit of GB Application No. 1916690.9 filed on Nov. 15, 2019 and issued as GB 2589091 on Jan. 12, 2022, and International Application No. PCT/EP2020/082077 which was filing on Nov. 13, 2020, the contents of which are hereby incorporated by reference for all purposes.

FIELD OF INVENTION

The present invention relates to methods for improving the spectral response of multiple coherent sound sources, where the delay between the sounds arriving from the sound sources at a receiver point results in spectral variation across both frequency and space.

BACKGROUND TO THE INVENTION

The custom installation (CI) market is growing in size for loudspeaker manufacturers, with manufacturers seeing an increasing number of their products specified into new homes and refurbishments. Many of these projects consist of increasingly large spaces; for instance large home cinemas three to four times the size of a normal living room. With these increasingly large spaces there is still a desire to maintain high sound pressure level (SPL) targets across the entire listening region. Furthermore, despite these desires for high SPL targets, there also remains a desire for high-fidelity playback.

Within professional audio and live sound there are well known solutions for generating high SPL levels. For instance, the concept of line-source arrays is well known; where closely located sources (drive units) are used to approximate a line-source, which decays at −3 dB per doubling in distance, rather than −6 dB per doubling as with a traditional point-source loudspeaker. However, such arrays require a large number of drive units, and either complicated mechanical designs, or computationally expensive processing in order to align the drive units to approximate line source acoustic characteristics. Additionally, practically, line arrays can only approximate a line source at low and mid-frequencies. Therefore, alternative sound sources such as horn-loaded compression drivers must be used to deliver high SPL at high frequencies, which, whilst delivering high SPL, do not deliver the high-fidelity desired in CI applications.

An alternative is to use multiple high-fidelity loudspeakers, fed with the same audio signal, as a single channel. FIG. 1 shows an exemplar CI installation as a home theatre system 100 with three sets of three in-wall loudspeakers used behind and either side of a projection screen 102 for each of the left, centre and right channels. The first set of three in-wall loudspeakers 104 is behind the projection screen 102, the second set 106 is to the left of the projection screen 102 and the third set 108 (made up of speakers 108*a*, 108*b* and 108*c*) is to the right of the projection screen 102. Each set of three loudspeakers is fed with the same signal. Fewer, or more, loudspeakers could be used for each channel, depending on the desired SPL (each doubling in number of speakers results in +6 dB increase in SPL). However, using multiple loudspeakers fed with the same signal creates problems due to the destructive interference between the multiple, coherent sound sources, sometimes known as comb-filtering.

The problem is known in 2.5-way loudspeakers which consist of three drive units, where one of the drive units operates at the highest frequency range and the other two of the drive units are commonly identical but operate across slightly different frequency ranges. One of the two identical drive units covers the frequency range all the way up to the crossover with the highest frequency drive unit, whilst the other is low-pass filtered so as to provide additional low-frequency energy to overcome the “baffle step” phenomenon without introducing interference in the mid-range where the distance between the drive units could give rise to comb-filtering. However, 2.5-way loudspeakers still have problems with performance.

Methods based on time delays, phase changes and beam steering can reduce or eliminate inference, but only for one given point in space and they may in fact increase interference in other positions.

Therefore, there is a need for improved methods to reduce interference between multiple coherent sources, whilst maintaining overall spectral balance.

SUMMARY OF THE INVENTION

According to a first aspect of the present invention, there is provided a method of generating a signal for driving a first linear array of sound sources, wherein the first linear array of sound sources comprises a primary sound source and one or more secondary sound sources. The method comprises the steps of receiving an audio signal for a first channel of an audio system, deriving, from the audio signal, a first signal and a second signal, applying a low-pass filter to the second signal to generate a second drive signal for driving the one or more secondary sound sources and applying a corresponding high-frequency shelving filter to the first signal to generate a first drive signal for driving the primary sound source. In this way interference between multiple coherent sources can be reduced, whilst maintaining overall spectral balance.

According to a second aspect of the present invention, a computer program product comprises computer executable code which when executed on one or more processors of an audio system, causes the system to perform the method of the first aspect. In this way the method of the first aspect of the present invention can be implemented by one or more processors of an audio system to reduce interference between multiple coherent sources, whilst maintaining overall spectral balance. By implementing the method with one or more processors the method may be carried out by a single processor of an audio system or may be carried out across multiple processors.

According to a third aspect of the present invention, an audio system comprises one or more digital signal processors which is adapted to perform the above-described method. In this way an audio system may implement the above-described method with only one or more digital signal processors.

According to a fourth aspect of the present invention, an audio system for generating a levelled sound field comprises a first linear array of sound sources which comprise a primary sound source and one or more secondary sound sources. The primary sound source is driven by a first drive signal and the secondary sound source is driven by a second drive signal. A first signal and a second signal are derived an audio signal received for a first channel of the audio system.

A low-pass filter is applied to the second signal to generate the second drive signal and a corresponding high-frequency shelving filter is applied to the first signal to generate the first drive signal. In this way interference between multiple coherent sources can be reduced, whilst maintaining overall spectral balance.

Preferably, the method further includes applying an all-pass filter to the first signal. In this way compensation is made for the additional interference introduced by the relative phase responses of the low-pass and high shelf filters that results in a loss of energy around a characteristic frequency of the filters.

Optionally, the method further includes applying additional, different all-pass filters to the first signal and the second signal. In this way the time-alignment between the first and second drive signals is improved.

In some embodiments a characteristic frequency of each of the low-pass filter and the high-frequency shelving filter is approximately the inverse of double a time delay between sound arriving at a listening position from the primary sound source and the one or more secondary sound sources. In this way, the characteristic frequency of each of the filters is at the frequency at which the first notch of destructive interference between at least two sound sources occurs. This ensures that the filters have the maximum effect of reducing interference between multiple coherent sources, whilst maintaining overall spectral balance.

In some embodiments a gain of the high-frequency shelving filter is $g=20 \log_{10}(N+1)$, wherein N is the number of secondary sound sources. This ensures that the high-frequency shelving filter is applied in the appropriate way to ensure the maximum effect of reducing interference between multiple coherent sources, whilst maintaining overall spectral balance.

Optionally, the first linear array of sound sources may be a first linear array of loudspeakers comprising a primary loudspeaker and one or more secondary loudspeakers.

The computer program product of the second aspect of the invention may be implemented as an update or enhancement to an existing digital signal processor sound source system, or else as an update or enhancement to an existing multichannel or stereo audio processor. In this way an existing system can be updated by providing an update to an existing audio system.

Preferably, in the audio system, the high-frequency shelving filter is implemented by a digital signal processor associated with the primary sound source and the low-pass filter is implemented by at least one digital signal processor associated with the one or more secondary sound sources. In this way, the filtering can be carried out at a removed level to provide the first drive signal and the second drive signal to the primary sound source and the one or more secondary sound sources. Alternatively, the filtering can be carried out at a local digital signal processor within the audio system or at a digital signal processor within a drive unit of a sound source itself. However, in the cases of a local digital signal processor and a digital signal processor within a drive unit the digital signal processors are associated with a the primary sound source or the one or more secondary sounds sources and hence the appropriate filters are implemented for generating the corresponding first and second drive signals.

Preferably, the audio system may be an in-wall audio system. In this way it can be ensured that there will be minimal sound reflections from the wall which may cause destructive interference to occur behind and around the sound sources in an unpredictable way, depending on the positioning of the speakers and the proximity to the wall and other surfaces which reflect sound.

Optionally, the audio system may have the sound sources of the first linear array of sound sources arranged vertically or horizontally. In this way the sound sources can be positioned as is optimal for the location in which the audio system is installed.

In some embodiments the audio system may further comprise a second linear array of sound sources driven by a third drive signal and a fourth drive signal derived from a second channel for the audio system in the same way as the first drive signal and the second drive signal and filtered in the same way as the corresponding signals in the first channel. In this way the concept of the invention can be extended to two of an audio system.

In some embodiments the audio system may further comprise at least one further linear array of sound sources driven by drive signals derived from at least one further channel for the audio system in the same way as the first drive signal and the second drive signal and filtered in the same way as the corresponding signals in the first channel. In this way the concept of the invention can be extended to three or more channels of an audio system.

In some implementations, the first linear array of sound sources is a first linear array of loudspeakers comprising a primary loudspeaker and one or more secondary loudspeakers. Preferably, the audio system may have the first linear array of loudspeakers arranged such that the distance between the acoustic centres of each subsequent loudspeaker of the first linear array of loudspeakers is between 15 cm and 30 cm. In this way the time delay between the sounds arriving at a listening position from the primary and secondary loudspeakers can be calculated and subsequently the frequency at which the first notch will occur and hence the characteristic frequency at which the low-pass filter and the high-frequency shelving filter should be set can be calculated accurately.

As will be appreciated by those skilled in the art, the present invention is capable of various implementations according to the application.

BRIEF DESCRIPTION OF THE DRAWINGS

Examples of the present invention will be described in detail with reference to the accompanying drawings, in which.

DETAILED DESCRIPTION

The present invention may be implemented in a number of different ways according to the audio system being used. The following describes some example implementations with reference to the figures.

This invention is intended to alleviate the effect of spatial aliasing between two or more sound sources in close proximity. The invention is necessary when the source signals for each close proximity sound source are coherent, such as when using multiple loudspeakers as a single channel within a home theatre system 100 as shown in FIG. 1.

Figure 1:
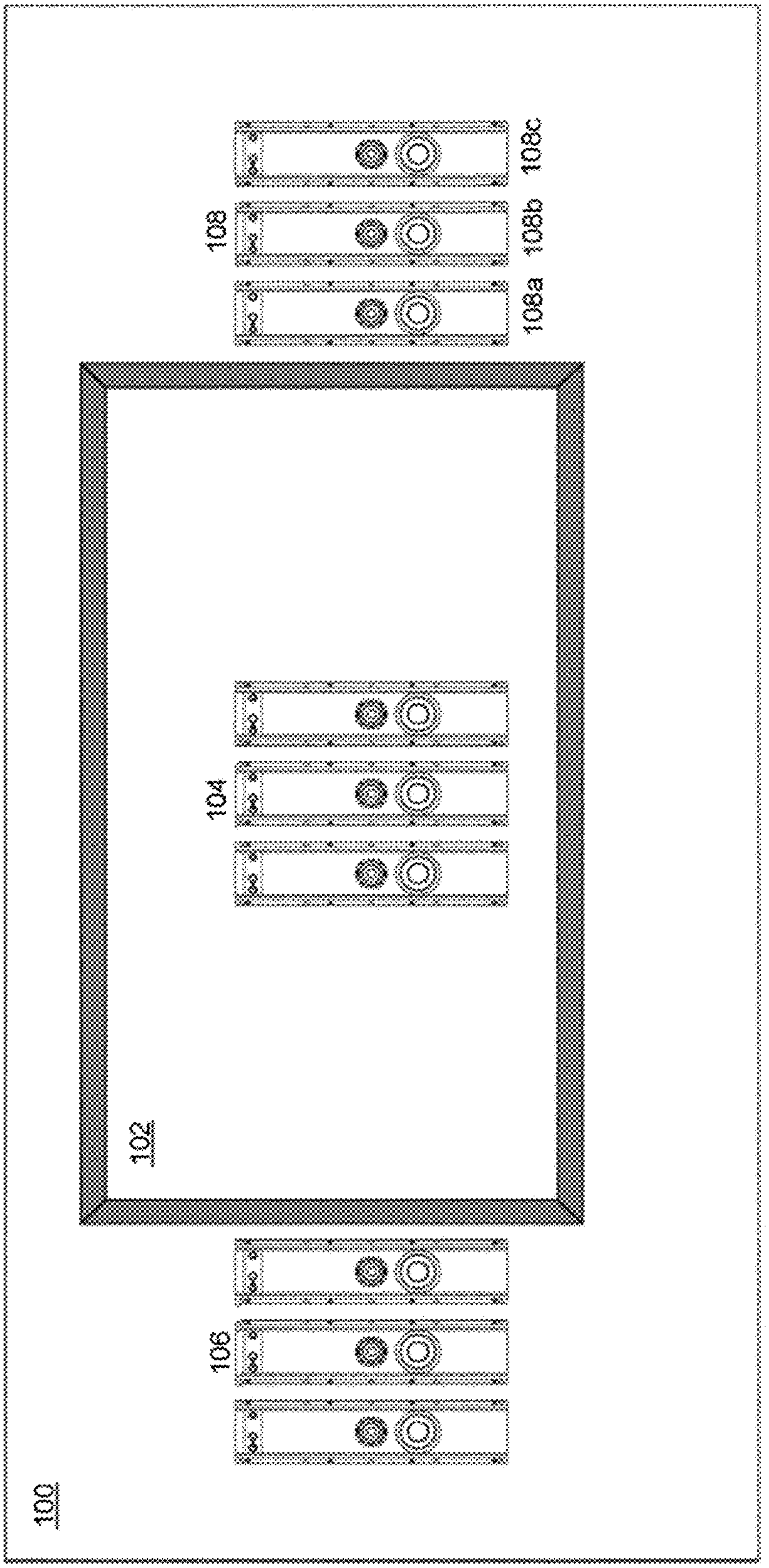
FIG. 1 shows an example installation of multiple in-wall loudspeakers.

Whilst in the example system in FIG. 1 the loudspeakers are mounted vertically; they could also be horizontally mounted. Furthermore, the centre set of loudspeakers 104 is not requisite, the system could be a stereophonic system consisting of only the left 106 and right 108 sets of loudspeakers, or indeed the system could be monophonic and consist of just one of the sets of loudspeakers. The right set of speakers 108 is made up of loudspeakers 108*a*, 108*b* and 108*c*. One of these will be a primary loudspeaker and two will be secondary loudspeakers. Additionally, whilst the sound sources in this example are two-way in-wall loudspeakers, the current invention could be applied to any close-proximity, coherent sound sources.

Figure 2:
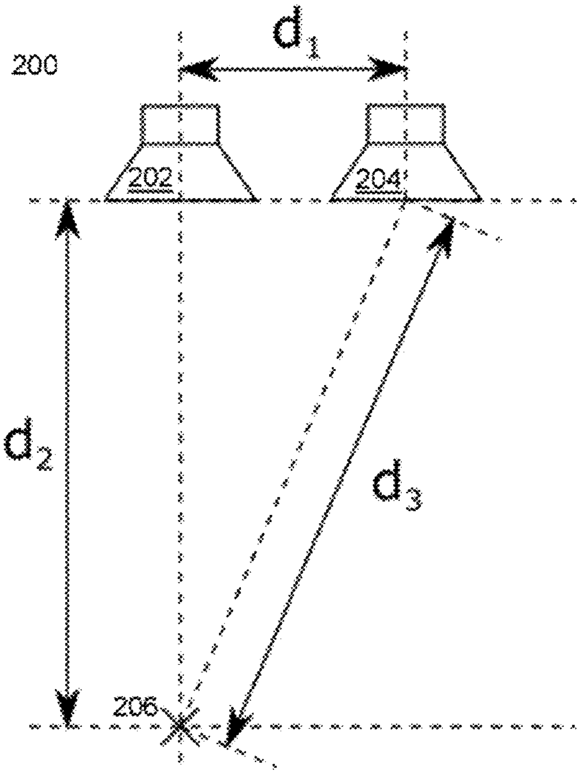
FIG. 2 shows an example of two sound sources to illustrate how a time delay occurs.

To demonstrate the problem this invention seeks to overcome, consider the system 200 given in FIG. 2. FIG. 2 shows a simple example of two sound sources, 202 and 204, with a distance $d_1$ metres between their acoustic centres. The listening position 206, marked by an 'X', is $d_2$ metres from one of the sound sources, namely the primary sound source 202, and is located both horizontally and vertically on-axis relative to this sound source. From Pythagoras' theorem, it is clear that the distance to the other sound source, the secondary sound source 204, $d_3=\sqrt{d_1^2+d_2^2}$ is larger than $d_2$. Therefore, this gives rise to a time delay, $$\Delta t = \frac{d_3 - d_2}{c}$$

seconds, where c=343 m/s is the speed of sound in air at 20 degrees Celsius, between the sounds arriving from the primary 202 and secondary 204 sound sources at the listening position 206. This results in a series of notches in the frequency response observed at the listening position 206 due to destructive interference between the primary 202 and secondary 204 sources. This is known as "comb-filtering". The notches will occur at frequencies $$f_n = \frac{n}{2\Delta t}$$

Hz, where n is all odd integers.

Figure 3:
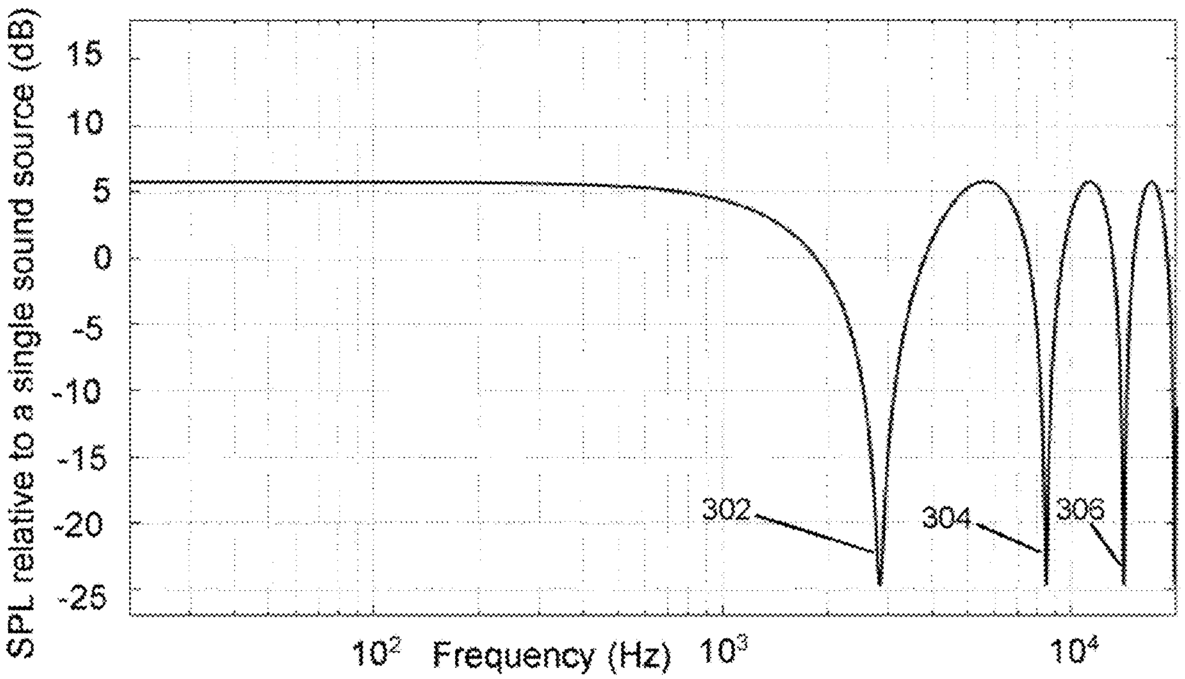
FIG. 3 shows an example of comb-filtering in the frequency response of the system shown in FIG. 2.

This comb-filtering effect is shown in FIG. 3 which plots frequency against sound pressure level relative to a single sound source. The notches of the "comb" shown in FIG. 3 are destructive interference occurring between the two sound sources 202 and 204. The first notch 302 is at $f_1$, the second notch 304 is at $f_3$, the third notch 306 is at $f_5$, and so on.

For example, a distance of 50 centimetres between the primary 202 and secondary 204 sound sources, with a listening position 206 that is 2 metres in front of the primary sound source 202, results in a path length difference of 6.15 centimetres. This corresponds to a time delay between the sounds arriving at the listening position of 179 microseconds. Therefore, the frequency spectrum at the listening position will exhibit notches at odd multiples of $f_1$=2.8 kHz, as shown in FIG. 3.

Whilst this example only consists of two sound sources, 202 and 204, the principle is the same for any number of sound sources greater than two. The pattern of notches in the frequency response simply gets more complex, with notches appearing at frequencies corresponding to the time delay to each secondary source, and odd harmonics of these frequencies.

When the primary and secondary sound sources are loudspeakers, the distance $d_1$ between the acoustic centres of the sound sources may typically be between 15 cm and 30 cm. When the primary and secondary sound sources are drive units within one loudspeaker, the distance $d_1$ between their acoustic centres may be as little as 5 cm. The further apart the acoustic centres of the sound sources are, the lower in frequency the comb filtering stretches and so headroom in the input signals for the high frequency shelving filter is lost. However, the upper limit of the distance $d_1$ between the acoustic centres of the sound sources depends on the listening distance $d_2$; with larger listening distances the sound sources can be further apart.

To reduce the effect of the comb-filtering, the invention applies a low-pass filter to the secondary sound sources 204 so that only the primary sound source 202 is operating at frequencies where destructive interference will occur. However, this will lead to a mismatch in the SPL at frequencies above and below the low-pass (above and below $f_1$) due to effectively having one sound source above the low-pass and two below it.

Figure 4:
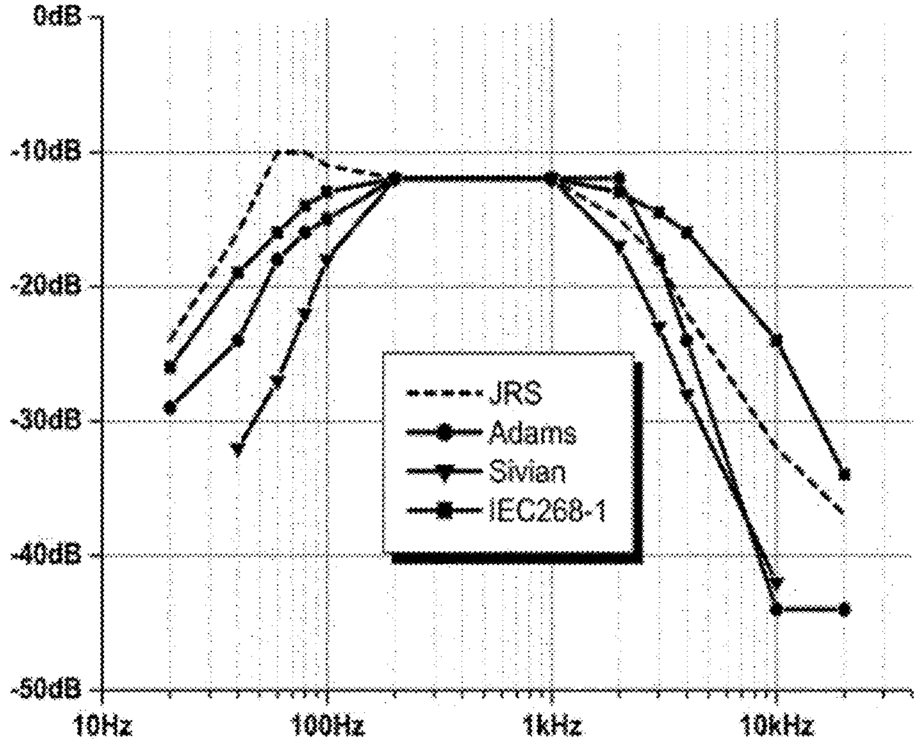
FIG. 4 shows examples of the power spectrum of typical known music.

Fortunately, there is a general reduction with frequency in energy in music content above 1 kHz, as shown in FIG. 4, which presents different data sets from Stuart, J. R. (2006). "Active loudspeakers", In Proceedings of the 21st AES UK Conference: Audio at Home. The data set IEC268-1 is an IEC standard noise spectrum for power testing audio products, the data sets Sivian and Adams relates to previous studies and the data set JRS is data analysis carried out by the author of the paper. It is therefore clear that this reduction in energy above 1 kHz is a common occurrence in music content as in all four different data sets there is a general reduction in energy above 1 kHz and energy below 100 Hz. This reduction in energy at higher frequencies offers potential processing headroom for compensating for the fact that above the aforementioned low-pass filter cut-off frequency there is only one source contributing. To implement this compensation, a corresponding high frequency shelving filter is applied to the primary sound source 202.

Figure 5:
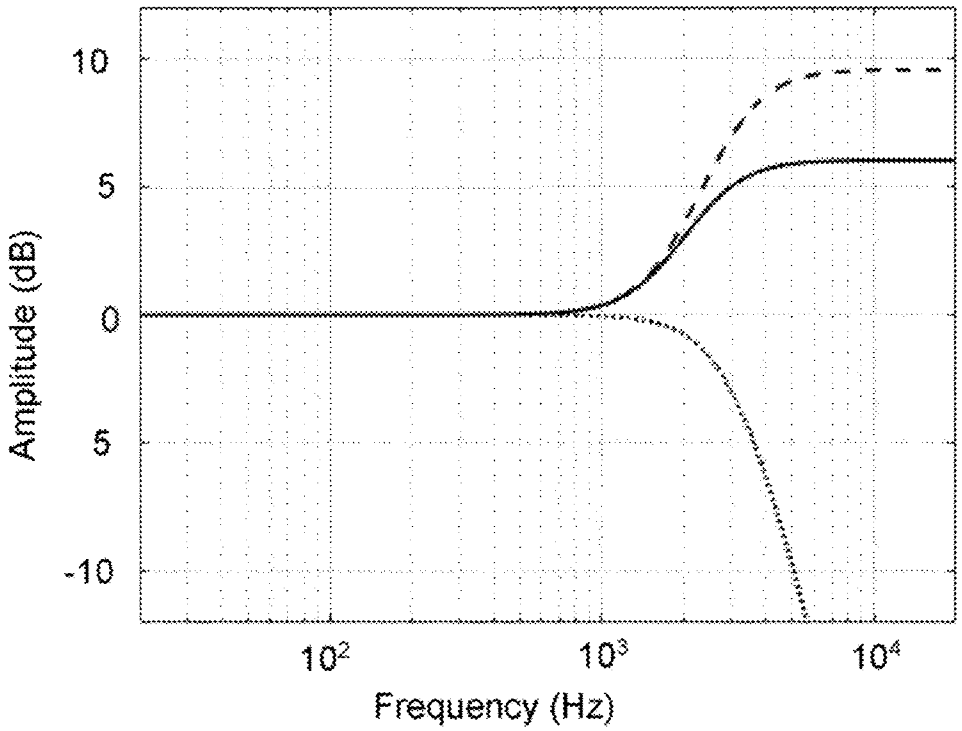
FIG. 5 shows possible filter responses for different numbers of secondary sources.

The gain of the high-frequency shelving filter will depend on the number of secondary sources according to the rule $g=20\log_{10}(N+1)$, where g is the gain of the shelving filter in decibels and N is the number of secondary sources. FIG. 5 shows possible responses for the low-pass filter and high frequency shelving filter for N=1 and N=2 secondary sources. The solid line in FIG. 5 shows a possible response for the high frequency shelving filter for N=1, the dashed line shows a possible response for the high frequency shelving filter for N=2, and the dotted line shows a possible response for the low-pass filter.

Figure 6:
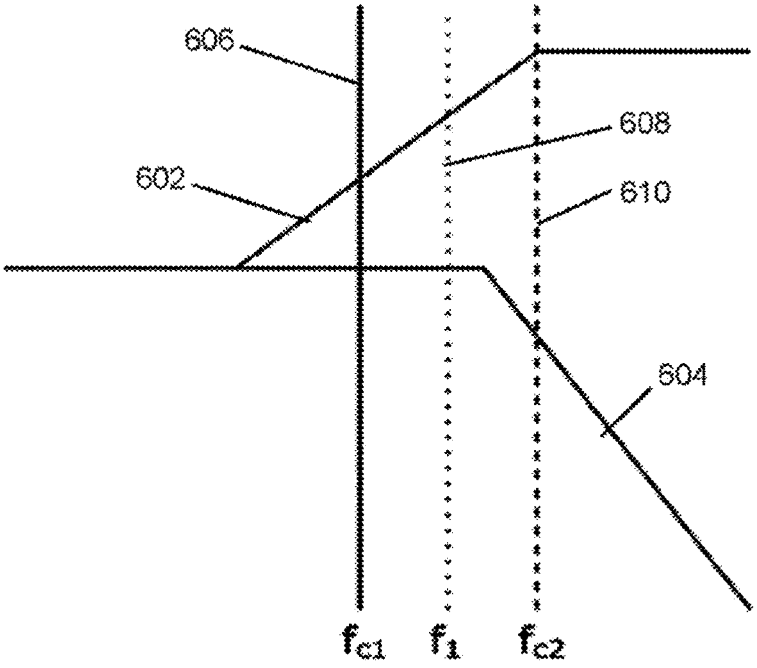
FIG. 6 shows the typical relationship between the characteristic frequencies of the low-pass and high-shelving filters and the first notch frequency of the comb-filter in the invention.

FIG. 6 shows that typically both the low-pass filter 604 and the high-frequency shelving filter 602 will have a characteristic transition frequency which may be similar, but not necessarily the same as $f_1$ and will be at or within a small frequency spread of $f_1$, the first notch frequency. The characteristic frequencies of both the low-pass filter(s) and the high-frequency shelving filter can be predicted by the previously calculated $f_1$ 608. As shown in FIG. 6, typically the characteristic frequency of the high frequency shelving filter 606, $f_{c1}$, will lie slightly below $f_1$ 608 and the characteristic frequency of the low-pass filter(s) 610, $f_{c2}$, will lie slightly above $f_1$ 608. However, the exact frequencies will require tuning by one skilled in the art, based on the specific system and implementation.

As demonstrated in FIG. 4, the peak level of frequencies in music rapidly drops off above 1 kHz, which affords headroom for applying the high frequency shelving filter, as most real-world systems are unlikely to exhibit destructive interference below 1 kHz. Nevertheless, careful attention must be taken that the system has appropriate protection to prevent damage to the sound sources in case of atypical signals.

Therefore, the present invention relates to methods taking advantage of this headroom in order to reduce interference between multiple coherent sources, whilst maintaining overall spectral balance.

Figure 7:
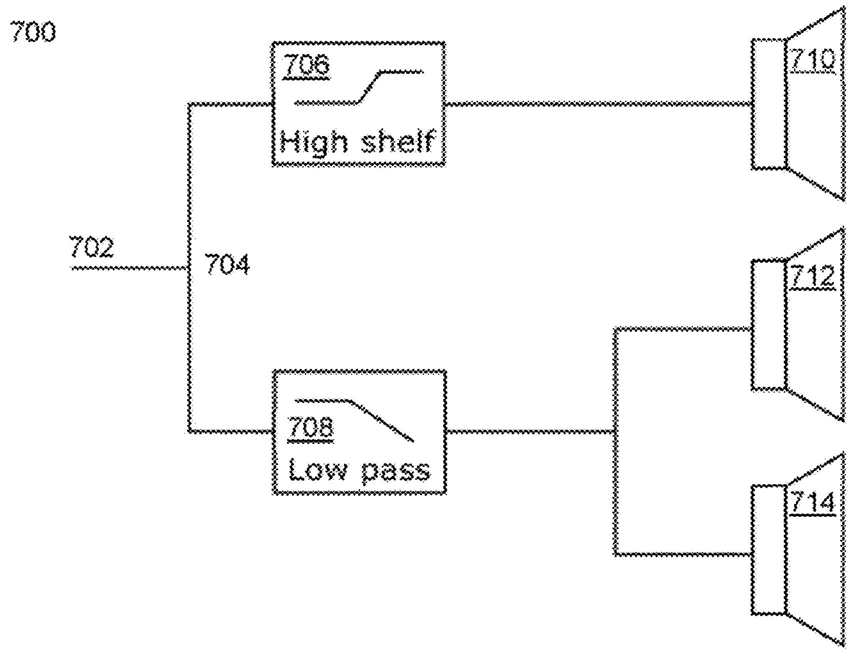
FIG. 7 shows a schematic of an embodiment of the invention implemented for three sound sources.

FIG. 7 illustrates such an embodiment for three sound sources: one primary 710 and two secondary, 712 and 714. FIG. 7 shows that an audio signal 702 for a channel of an audio system is split 704 into a drive signal for a primary sound source 710 and a drive signal for two secondary sound sources, 712 and 714. A high-frequency shelving filter 706 is applied to the drive signal for the primary sound source 710 and a low-pass filter 708 is applied to the drive signal for the secondary sound source, 712 and 714.

Figure 8:
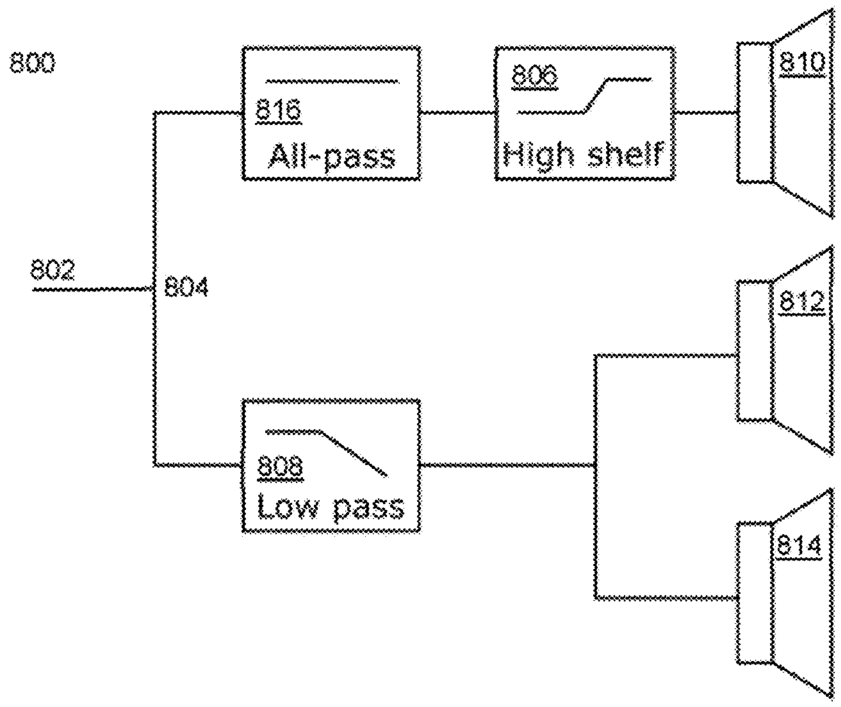
FIG. 8 shows a schematic of a second embodiment of the invention implemented for three sound sources.

A further embodiment, shown in FIG. 8, introduces an all-pass filter 816 to the primary sound source 810. FIG. 8 shows that an audio signal 802 for a channel of an audio system is split 804 into a drive signal for a primary sound source 810 and a drive signal for two secondary sound sources, 812 and 814. A high-frequency shelving filter 806 and an all-pass filter 816 are applied to the drive signal for the primary sound source 810 and a low-pass filter 808 is applied to the drive signal for the secondary sound sources, 812 and 814. The newly introduced all-pass filter 816 to the primary sound source 810 is in order to compensate for the phase-shift of the low-pass filter 808 on the secondary sound source, 812 and 814. For example, a second order low-pass filter 808 results in a 180 degree phase-shift about the centre frequency of the filter. A first order all-pass filter 816 could therefore be applied to the primary sound source 810, in order to apply a complementary 180 degree phase-shift. As such, the centre frequency of the all-pass filter 816 should be similar to that used for the low-pass filter 808.

Figure 9:
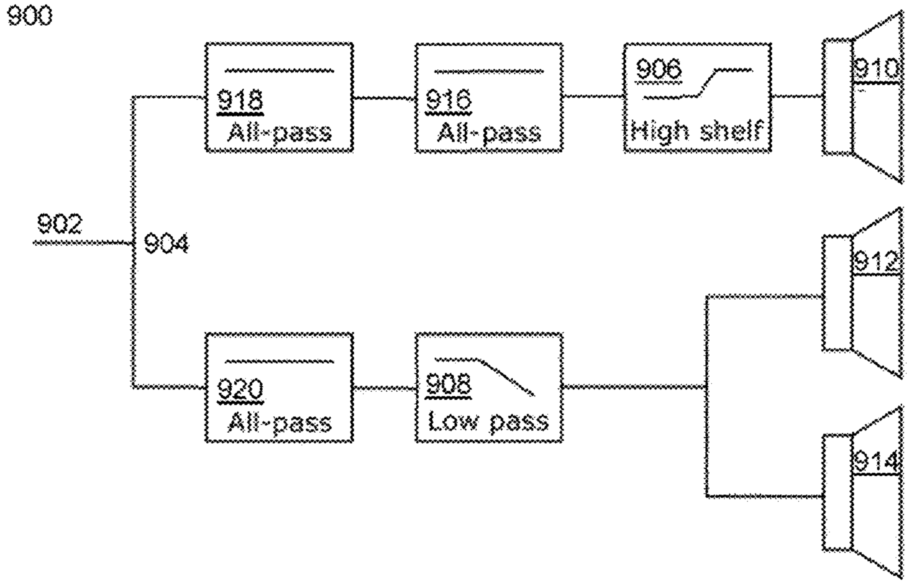
FIG. 9 shows a schematic of a third, and preferred, embodiment of the invention implemented for three sound sources.

A third, and preferred embodiment, as shown in FIG. 9, introduces additional all-pass filters, 918 and 920, to both the primary 910 and secondary, 912 and 914, sound sources. FIG. 9 shows that an audio signal 902 for a channel of an audio system is split 904 into a drive signal for a primary sound source 910 and a drive signal for two secondary sound sources, 912 and 914. A high-frequency shelving filter 906, an all-pass filter 916 and an additional all-pass filter 918 are applied to the drive signal for the primary sound source 910 and a low-pass filter 908 and an all-pass filter 920 are applied to the drive signal for the secondary sound sources, 912 and 914. The newly introduced all-pass filters, 918 and 920, can be used improve the time-alignment between the first and second drive signals, reducing the comb-filter frequency cancellation effect. For example, the all-pass filter on the secondary sound source can be applied below the frequency of the first notch ($f_1$), while the all-pass filter on the primary sound source can be applied above the frequency of the first notch ($f_1$), in order to reduce the cancellation at the first notch frequency by inverting the phase relationship.

Figure 10:
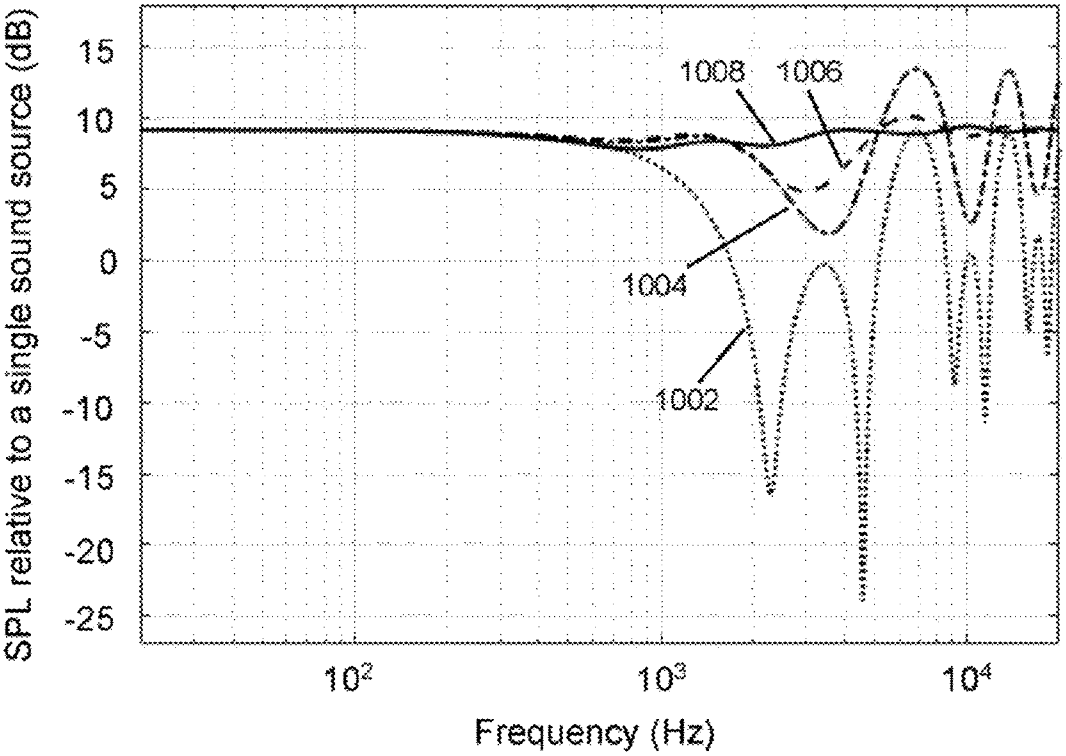
FIG. 10 shows an example of how the processing in three different embodiments changes the sound pressure level relative to a single sound source

FIG. 10 shows a simulated frequency response at the listening position without the filters proposed by this invention and with the different combinations of filters suggested above. The dotted line 1002 shows the frequency response when no filters are applied. The dashed-dotted line 1004 shows the frequency response when just the low-pass filter and the high frequency shelving filter are applied (as in FIG. 7). The dashed line 1006 shows the frequency response when the all-pass filter on the primary source is applied in addition to the low-pass filter and the high frequency shelving filter (as in FIG. 8). The solid line 1008 shows the frequency response when the additional all-pass filters are added to both the primary and secondary sound sources, in addition to all other filters is applied (as in FIG. 9). It can be seen that all combinations of filters proposed significantly reduce the spectral variation. However, when the further all-pass filters are applied, it can be seen that the spectral variation is even further reduced compared to the other combinations of filters.

Figure 11A:
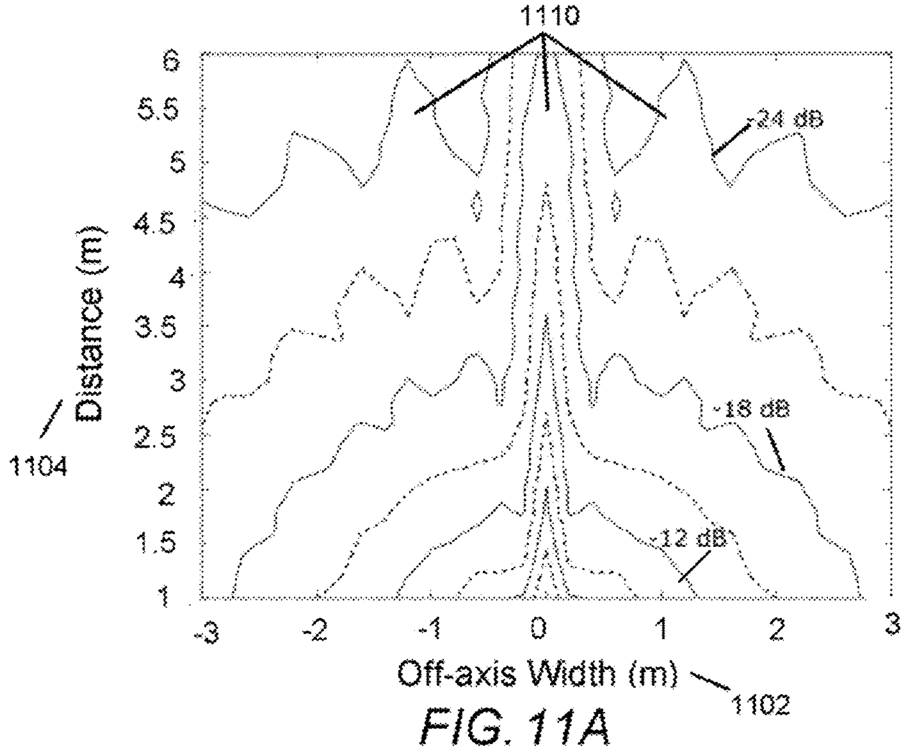
FIG. 11A is a contour plot which shows spectral variation across space without the proposed filters.
Figure 11B:
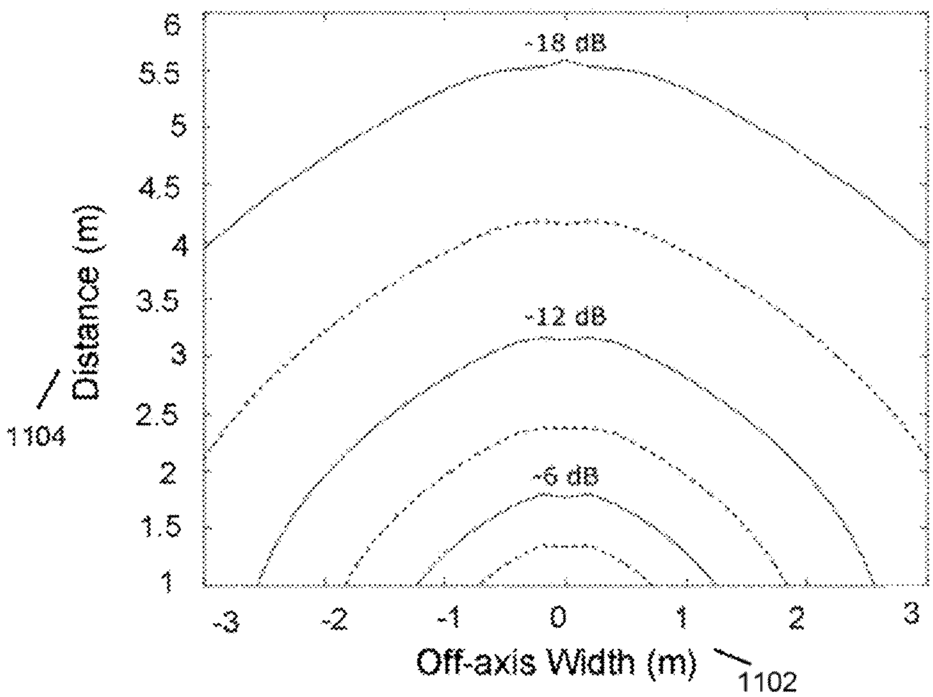
FIG. 11B is a contour plot which shows spectral variation across space with the proposed filters.

Additionally, as shown in FIGS. 11A and 11B, the proposed invention not only improves the frequency response at the listening position, but also reduces spectral variation across space. FIG. 11A shows the variation in the sound pressure level across space when no filters are applied. FIG. 11B shows the variation in the sound pressure level across space when all the filters, as set out in FIG. 9, are applied. The horizontal-axis 1102 of both FIG. 11A and FIG. 11B represents the distance off-axis of the listening position in the plane of the sound source array. The vertical-axis 1104 represents the distance of the listening position away from the array. The contour lines within the plots represents the SPL at that positon in decibels, with each line representing a decrease in SPL of 3 decibel (dB). Some contours representing a multiple of 6 dB decrease have been labelled as such.

As can be seen from FIG. 11A, when no filters are applied there is significant destructive interference, as illustrated in the modulation of the contour lines, with regions of high SPL labelled as 1110. Conversely, in FIG. 11B, when there is filtering applied, as set out in FIG. 9, there is an absence of modulating in the contour lines and the SPL falls off uniformly.

In the preferred embodiment the low-pass, high-frequency shelving and all-pass filters are two-pole, two-zero digital biquad filters, the design of which is known to someone skilled in the art. Such filters are preferred due to the fact that the implementation of these filters is simple, computationally efficient and supported on many existing signal processing systems. However, more complex designs for the filters could be used and the filters can be implemented in software or hardware as well as in the analogue or digital domains.

In some embodiments the filters may be implemented as an update or enhancement to an existing system, or as part of the design of a new system. Additionally, in some embodiments the filters will be implemented internally to the system, for example within each of the loudspeakers shown in FIG. 1, whereas in other embodiments the filters will be applied externally in a pre-processor device.

Odd numbers of sound sources are preferred, in order to maintain symmetry in the radiated sound field. Furthermore, the preferred number of sources is three in order to maximise the effectiveness of the filters and limit the required gain of the shelving filter. However the current invention could be applied to any number of close proximity sound sources greater than one.

The invention claimed is:

1. A method of generating a signal for driving a first linear array of multiple coherent sound sources, wherein said first linear array of multiple coherent sound sources comprises a primary sound source and one or more secondary sound sources, the method comprising the steps of:

receiving an audio signal for a first channel of an audio system;

deriving, from the audio signal, a first drive signal for driving the primary sound source and a second drive signal for driving the one or more secondary sound sources;

applying a low-pass filter to the second drive signal for driving the one or more secondary sound sources, the low-pass filter reducing energy at higher frequencies where destructive interference would otherwise occur between sound from the primary sound source and the one or more secondary sound sources; and applying a corresponding high-frequency shelving filter to the first drive signal for driving the primary sound source, the high-frequency shelving filter compensating for reduction of energy at higher frequencies due to the low-pass filter, wherein a gain, g, of the high-frequency shelving filter is $g=20 \log_{10} (N+1)$, wherein Nis the number of secondary sound sources.

2. A method according to claim 1, further comprising applying a first all-pass filter to the first drive signal for compensating for additional interference introduced by relative phase responses of the low-pass filter and the high-frequency shelving filter that results in a loss of energy around a characteristic frequency of the filters.

3. A method according to claim 1, further comprising applying a second all-pass filter to the first drive signal and applying a third all-pass filter to the second drive signal for improving the time-alignment between the first and second drive signals.

4. A method according to claim 1, wherein a characteristic frequency of each of the low-pass filter and the high-frequency shelving filter is approximately the inverse of double a time delay between sound arriving at a listening position from the primary sound source and the one or more secondary sound sources.

5. A method according to claim 1, wherein the first linear array of multiple coherent sound sources is a first linear array of loudspeakers comprising a primary loudspeaker and one or more secondary loudspeakers.

6. A non-transitory computer readable medium comprising computer executable code which when executed on one or more processors of an audio system, causes the system to perform the method according to claim 1.

7. A non-transitory computer readable medium according to claim 6, implemented as an update or enhancement to an existing digital signal processor sound source system.

8. A non-transitory computer readable medium according to claim 6, implemented as an update or enhancement to an existing multichannel or stereo audio processor.

9. An audio system comprising one or more digital signal processors adapted to perform the method according to claim 1.

10. An audio system according to claim 9, wherein the high-frequency shelving filter is implemented by a digital signal processor associated with the primary sound source and the low-pass filter is implemented by at least one digital signal processor associated with the one or more secondary sound sources.

11. An audio system for generating a levelled sound field, the audio system comprising:

a first linear array of multiple coherent sound sources comprising a primary sound source and one or more secondary sound sources, wherein:

the primary sound source is driven by a first drive signal and the one or more secondary sound sources are driven by a second drive signal; and the first drive signal and the second drive signal are derived from an audio signal received for a first channel of the audio system;

a low-pass filter applied to the second drive signal, the low-pass filter reducing energy at higher frequencies where destructive interference would otherwise occur between sound from the primary sound source and the one or more secondary sound sources; and a corresponding high-frequency shelving filter applied to the first drive signal, the high-frequency shelving filter compensating for reduction of energy at higher frequencies due to the low-pass filter, wherein a gain, g, of the high-frequency shelving filter, is $g=20 \log_{10} (N+1)$, wherein N is the number of secondary sound sources.

12. An audio system according to claim 11, further comprising a first all-pass filter applied to the first drive signal for compensating for additional interference introduced by relative phase responses of the low-pass filter and the high-frequency shelving filter that results in a loss of energy around a characteristic frequency of the filters.

13. An audio system according to claim 11, further comprising additional, different second and third all-pass filters applied to both the first drive signal and the second drive signal for improving the time-alignment between the first and second drive signals.

14. An audio system according to claim 11, wherein the characteristic frequency of each of the low-pass filter and the high-frequency shelving filter is approximately the inverse of double a time delay between sound arriving at a listening position from the primary sound source and the one or more secondary sound sources.

15. An audio system according to claim 11, wherein the multiple coherent sound sources of the first linear array are for installation in a wall.

16. An audio system according to claim 11, wherein the loudspeakers of the first linear array of multiple coherent sound sources are arranged vertically or horizontally.

17. An audio system according to claim 11, further comprising a second linear array of multiple coherent sound sources driven by a third drive signal and a fourth drive signal derived from an audio signal received for a second channel of the audio system in the same way as the first drive signal and the second drive signal and filtered in the same way as the corresponding signals in the first channel.

18. An audio system according to claim 17, further comprising at least one further linear array of multiple coherent sound sources comprising a primary sound source and one or more secondary sound sources driven by a fifth drive signal and a sixth drive signal derived from an audio signal received for at least one further channel for of the audio system in the same way as the first drive signal and the second drive signal and filtered in the same way as the corresponding signals in the first channel.

19. An audio system according to claim 11, wherein the first linear array of multiple coherent sound sources is a first linear array of multiple coherent loudspeakers comprising a primary loudspeaker and one or more secondary loudspeakers.

20. An audio system according to claim 19, wherein the first linear array of multiple coherent loudspeakers is arranged such that the distance between the acoustic centres of each subsequent loudspeaker of the first linear array of multiple coherent loudspeakers is between 15 cm and 30 cm.

* * * * *